United States Patent [19]
Raymond

[11] Patent Number: 5,953,540
[45] Date of Patent: Sep. 14, 1999

[54] SCSI CABLE WITH TWO CABLE SEGMENTS HAVING A FIRST RESISTOR COUPLED TO A Y-CONNECTION FROM EACH SEGMENT AND A SECOND RESISTOR COUPLED TO ONE CORRESPONDING CONDUCTOR

[75] Inventor: Patrick A. Raymond, Fort Bend County, Tex.

[73] Assignee: Compaq Computer Corporation, Houston, Tex.

[21] Appl. No.: 08/883,485

[22] Filed: Jun. 26, 1997

[51] Int. Cl.⁶ .................................................. G06F 13/00
[52] U.S. Cl. .............................................. 395/882; 326/30
[58] Field of Search ................................ 395/882; 326/30

[56] References Cited

U.S. PATENT DOCUMENTS

| | | | |
|---|---|---|---|
| 5,495,584 | 2/1996 | Holman, Jr. et al. | 395/308 |
| 5,528,167 | 6/1996 | Samela et al. | 326/30 |
| 5,577,931 | 11/1996 | Leshem | 439/497 |
| 5,628,637 | 5/1997 | Pecone et al. | 439/74 |
| 5,642,337 | 6/1997 | Oskay et al. | 369/30 |
| 5,675,723 | 10/1997 | Ekrot et al. | 395/182.02 |
| 5,680,065 | 10/1997 | Park | 326/86 |
| 5,745,795 | 4/1998 | Pecone et al. | 395/882 |
| 5,751,977 | 5/1998 | Alexander | 395/306 |

*Primary Examiner*—Thomas O. Lee
*Assistant Examiner*—Ilwoo Park
*Attorney, Agent, or Firm*—Akin, Gump, Strauss, Hauer & Feld, LLP

[57] ABSTRACT

A SCSI cable including first and second SCSI cable segments, a SCSI Y connector that includes connector contacts to couple corresponding SCSI signal conductors of each of the SCSI cable segments together and to corresponding ones of the connector contacts of the SCSI Y connector, a first resistor coupled between the SCSI request signal conductor of each of the SCSI cable segments and a corresponding connector request signal contact of the SCSI Y connector, a SCSI end connector including connector contacts that couples corresponding SCSI signal conductors of the second SCSI cable segment to corresponding connector contacts, and a second resistor coupled between the SCSI request signal conductor of the second cable segment and a corresponding request signal contact of the SCSI end connector. In this manner, the request signal asserted by any one of the targets is effectively filtered to reduce or otherwise eliminate reflections on the SCSI request signal.

16 Claims, 2 Drawing Sheets

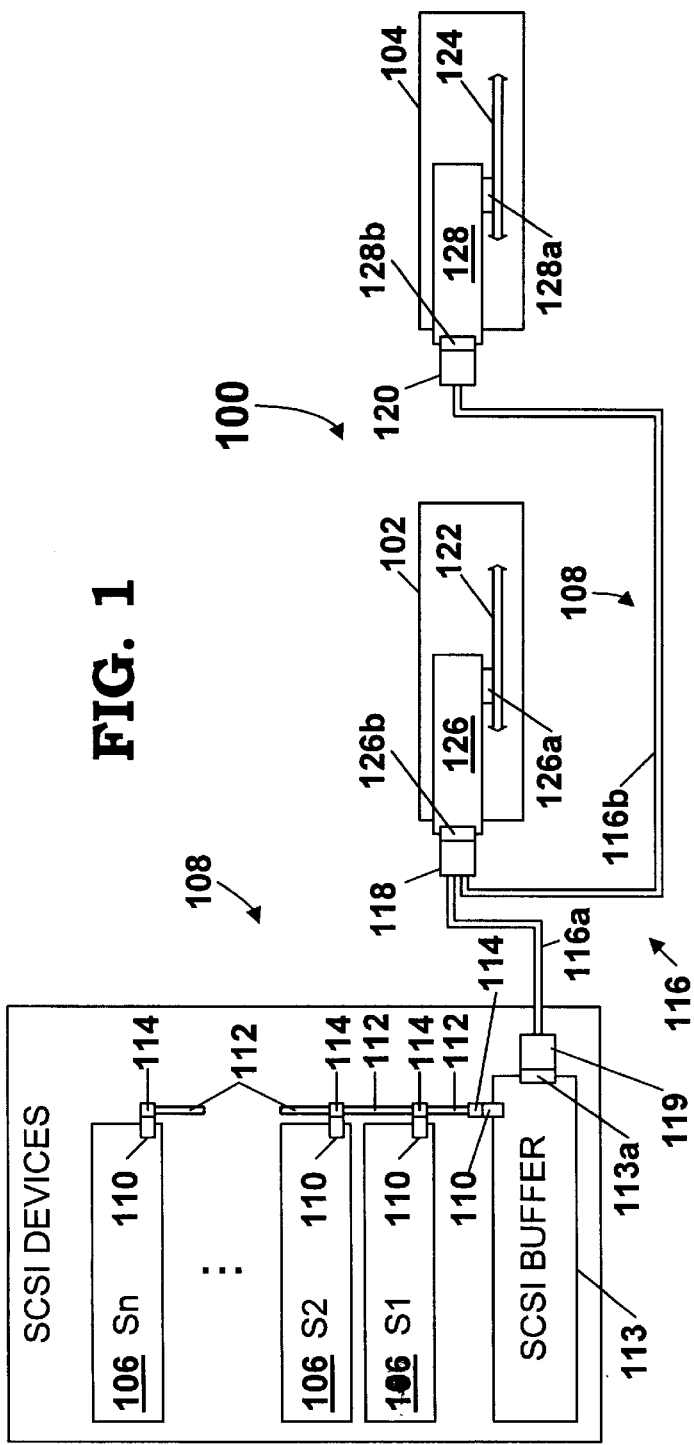
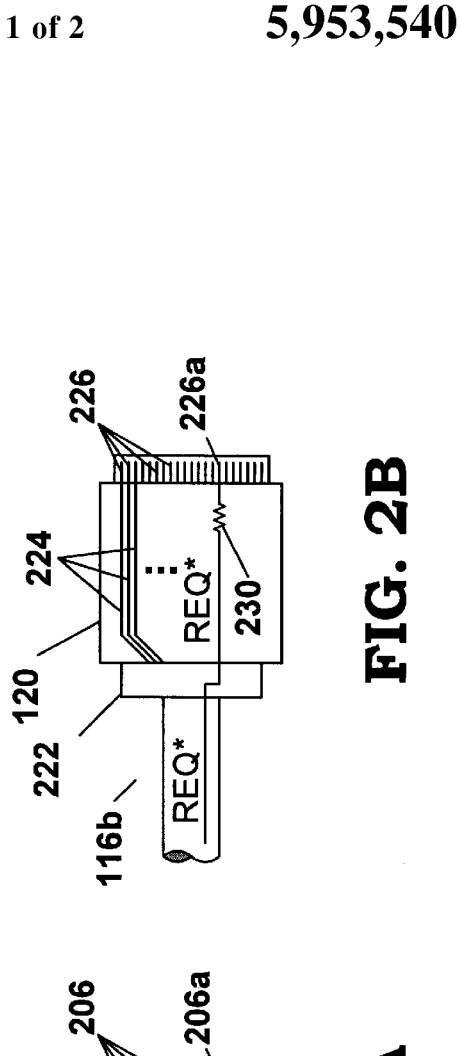
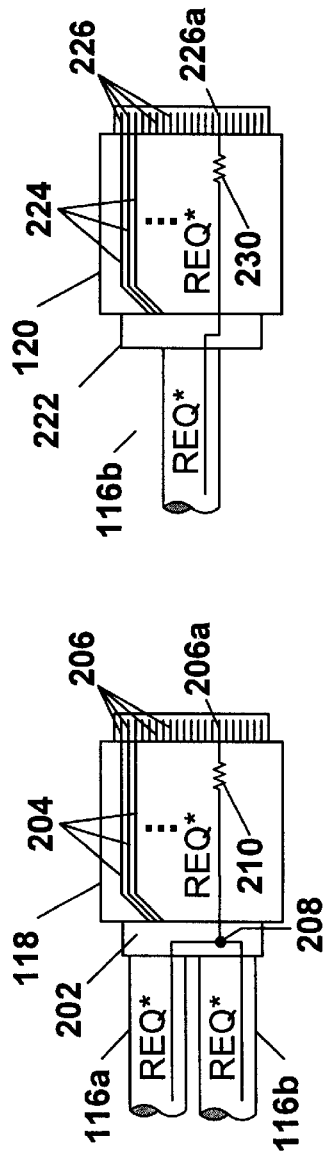

SCSI CABLE WITH TWO CABLE SEGMENTS HAVING A FIRST RESISTOR COUPLED TO A Y-CONNECTION FROM EACH SEGMENT AND A SECOND RESISTOR COUPLED TO ONE CORRESPONDING CONDUCTOR

FIELD OF THE INVENTION

The present invention relates to a SCSI cable that filters one or more signals of a SCSI bus to enable multiple computer systems to connect and interface with peripheral devices via the SCSI bus.

DESCRIPTION OF THE RELATED ART

The small computer system interface (SCSI) was designed to connect one or more peripheral devices to a computer system. The first version of SCSI, called SCSI-1, was approved by the American National Standards Institute (ANSI) as the ANSI X3.131-1986 standard in 1986. The SCSI-1 standard defined a parallel interface that connects up to eight parallel devices along a single cable, and was referred to as a SCSI bus. The SCSI bus is a relatively independent and intelligent peripheral interface for enabling data communication between the peripheral devices, such as hard disk drives, tape drives, optical drives including CD-ROM drives, CD-ROM writers, Magneto-Optical drives and WORM drives, printers, scanners, etc. The original SCSI bus provided an 8-bit parallel communication interface that operated at an asynchronous transfer rate of up to 1.5 megabytes per second (MB/sec) or at a synchronous transfer rate of up to 5 MB/sec.

A new SCSI standard was approved in 1994 by ANSI and designated the ANSI X3.131-1994 standard, otherwise referred to as SCSI-2 or Fast SCSI. Fast SCSI doubled the synchronous rate to 10 MB/sec for the 8-bit version. The data bus of SCSI-2 could optionally be increased to either 16 or 32 bits to double or quadruple the speed of the 8-bit version. The 16-bit version allows connection of up to 16 devices and the 32-bit version allows connection of up to 32 devices. SCSI buses with the larger data widths are referred to as Wide SCSI-2 or Fast Wide SCSI and enable synchronous transfer rates up to 20 MB/sec for a 16-bit Wide SCSI-2 bus and up to 40 MB/sec for a 32-bit Wide SCSI-2 bus. Newer standards are currently being developed, known as SCSI-3, which may include a plurality or family of standards including Fast-20 SCSI, Ultra SCSI, DoubleSpeed SCSI, etc.

Several SCSI cable types are known including ribbon cables and twisted-wire pair cables, each having an impedance between 90 and 140 ohms($\Omega$). The corresponding connector types include a 50-pin flat cable connector called an IDC header for ribbon cables and a 50-pin Centronics type connector for the twisted-wire pair cable. Other cable and connectors types are known, such as the DB-50 Type-1 connector, which was the initial connector type for SCSI-1. The 50 pin version is designated as an "A-cable" for use with 8-bit SCSI-1 and SCSI-2. A "P-cable" is also known for use with 16-bit SCSI-2 and SCSI-3 and includes 68 conductors to increase the data bus to 16 bits. Regardless of the cable type employed, SCSI buses may be operated in either one of two physical types including single-ended and differential. In the single-ended version, a ground signal conductor is provided for each data and control signal so that devices communicate over signal/ground pairs of wires. In the differential version, each signal includes a positive and a negative counterpart forming differential signal wire pairs. Although differential communication is less susceptible to noise and enables the SCSI bus to be physically longer (up to 25 meters), the single-ended version is less expensive and is fast over short distances. The present invention primary concerns single-ended SCSI buses.

SCSI devices are typically connected in a serial or daisy-chain fashion to a single SCSI controller. A SCSI controller card is typically implemented to plug into a slot of an expansion or peripheral bus of a computer system, such as an integrated system architecture (ISA) bus, an extended-ISA (EISA) bus or a peripheral components interconnect (PCI) bus. The SCSI controller includes an external SCSI connector, such as a Centronics type connector or the like, for connecting several more SCSI devices in daisy-chain fashion. A ribbon cable with a plurality of IDC header connectors is often used for daisy-chaining multiple SCSI devices.

The SCSI controller is generally referred to as the initiator or host which starts or initiates communication. The peripheral SCSI devices are targets, which receive communications from the initiator and respond accordingly. Each peripheral device is assigned or otherwise associated with a unique SCSI ID on the SCSI bus, so that only the designated peripheral device responds to requests by the initiator. Two clock signals are used to enable communication across the SCSI bus, including a request (REQ*) signal used by a target to request an information transfer handshake and an acknowledge (ACK*) signal used by an initiator to acknowledge the request. An asterisk (*) at the end of a signal name denotes negative logic, where the signal is considered asserted when low or zero (0) or at a falling edge and negated when high or upon a rising edge. Otherwise, signals generally conform to positive logic levels. When a target is driving the bus, the REQ* signal is used by the target to latch the SCSI data signals, or the SCSI data bus, into the initiator's buffer. When the initiator is driving the SCSI bus, the ACK* signal is used by the initiator to latch the SCSI data bus signals into the target's buffer.

An important consideration to enable operation is proper termination or filtering of the SCSI bus. Proper filtering reduces or otherwise eliminates ringing or signal reflections on the SCSI bus that would otherwise cause erroneous operation or malfunction. The SCSI controller, almost invariably located at one end or at the beginning of the daisy-chain, typically included an appropriate terminator. The initiator terminator was built-in or separately connected. A terminator was also coupled at the opposite end of the daisy-chained SCSI cable near or at the last SCSI device. Terminators placed at any other intermediate location typically caused the SCSI bus to malfunction. Common SCSI terminators included two resistors coupled to each signal, one coupled to power and the other coupled to ground. The data signals and many of the control signals are level sensitive and sensed at DC condition. Filtering of level sensitive signals is not critical because signal reflections could be tolerated to some degree as long as a stable condition was reached at the assertion of a clocking signal. The REQ* and ACK* clocking signals, however, are edge sensitive and latch data on a transition state, such as a rising or falling edge, so that filtering of these clocking signals is essential for proper operation. Undesirable signal reflections on the REQ* and ACK* signals result in false clock signals that causes unpredictable results. For example, false clock signals may cause erroneous data to be latched, or the correct data to be latched at the wrong time or not to be latched at all.

It has been desired and attempted to connect at least two SCSI controllers or initiators to the SCSI bus. At least one of the additional initiators, however, is not located at the end of the SCSI bus and caused operational malfunctions. In particular, the intermediate computer and/or SCSI controller caused undesirable reflections effectively disabling normal SCSI operation. A terminator placed at either or both SCSI controllers have failed to enable proper operation, since the SCSI bus was not properly terminated in either case. In fact, a significant amount of SCSI literature has warned against connecting multiple computers on a SCSI bus in this manner because it was known that the SCSI bus would not operate.

SUMMARY OF THE INVENTION

A SCSI cable according to the present invention includes first and second SCSI cable segments, each including a SCSI signal conductor for each SCSI signal, a SCSI Y connector that includes connector contacts to couple corresponding SCSI signal conductors of each of the SCSI cable segments together and to corresponding ones of the connector contacts of the SCSI Y connector, a first resistor coupled between one SCSI signal conductor of each of the SCSI cable segments and a corresponding connector contact of the SCSI Y connector, a SCSI end connector including connector contacts that couples corresponding SCSI signal conductors of the second SCSI cable segment to corresponding connector contacts, and a second resistor coupled between one SCSI signal conductor of the second cable segment and a corresponding connector contact of the SCSI end connector. In the preferred embodiment, the first and second resistors are coupled to the SCSI conductor that conducts the SCSI request signal. In this manner, the request signal asserted by any one of the targets is effectively filtered to reduce or otherwise eliminate reflections on the SCSI request signal.

Preferably, the resistors are each approximately 110 ohms. However, the resistor values may depend upon the particular controller used. It is desired to achieve proper termination of the request signal at each SCSI controller. Also, the cable segments each include 68 conductors and is operated according to Fast Wide SCSI-2. Any type of cables and connectors are contemplated, such as twisted-wire pair cables with Centronics type connectors, or a 68 conductor cable with 68 pin mini D connectors, etc.

A filtered SCSI connection according to the present invention is provided for a SCSI cable coupled between a plurality of SCSI controllers and at least one SCSI target device. The filtered SCSI connection includes a conductor having a first end for electrically coupling to the request signal connection of the SCSI target device(s), an end resistor having a first end coupled to the second end of the conductor and a second end for coupling to a request signal connection of a corresponding SCSI controller, one or more Y connections each electrically coupled to the conductor at corresponding intermediate location(s) between the first and second ends of the conductor, and one or more intermediate resistors, each having a first end coupled to a corresponding Y connection and a second end for coupling to a request signal connection of a corresponding SCSI controller.

The resistors preferably terminate each request signal connection to an impedance between 90 to 140 ohms. In the embodiment described herein, the resistors each have a resistance of approximately 110 ohms. However, different configurations and embodiments may require different resistance values to properly filter the SCSI request signal. For three SCSI controllers, the SCSI connection includes two Y connections, each electrically coupled to the conductor at one of two intermediate locations between the first and second ends of the conductor. The SCSI connection also includes two series resistors, each having a first end coupled to one of the two Y connections and a second end for coupling to a request signal connection of a corresponding one of the three SCSI controllers.

A SCSI system according to the present invention includes at least two SCSI controllers, each having a SCSI connector including a request signal contact, at least one SCSI target device having a SCSI connector including a request signal contact, and a SCSI cable implemented according to the present invention. The SCSI cable includes at least two SCSI cable segments daisy-chained together, where each includes a request signal conductor. It is noted that the SCSI cable may include any number of SCSI cable segments depending upon the number of SCSI controllers desired and the limits of the particular SCSI standard. For a 16-bit Fast Wide SCSI system, for example, a total of 16 devices are allowed including both target and initiator devices.

The SCSI cable further includes a first SCSI end connector plugged into the SCSI connector of the SCSI target device(s), which is also coupled to one end of the daisy-chained SCSI cable segments. The first SCSI end connector couples the request signal contact of the SCSI target device(s) to a request signal conductor of the daisy-chained SCSI cable segments. The SCSI cable includes one or more SCSI Y connectors, each plugged into a SCSI connector of one of the SCSI controllers and including an intermediate Y connection for coupling together adjacent SCSI cable segments. Each SCSI Y connector includes a resistor having one end coupled to the request signal conductors of the adjacent SCSI cable segments and a second end coupled to a request signal conductor of the SCSI connector of one of the SCSI controllers. The SCSI cable further includes a second SCSI end connector plugged into the SCSI connector of another one of the SCSI controllers and coupled to the second end of the daisy-chained SCSI cable segments, where the second SCSI end connector includes an end resistor coupled between a request signal conductor of the daisy-chained SCSI cable segments and a request signal conductor of the other SCSI controller. Preferably, the resistors of each of the SCSI Y connectors and the end resistor each terminates corresponding request signal conductors of the SCSI cable segments to an impedance of between 90 to 140 ohms.

In the preferred embodiment, the SCSI system includes a plurality of SCSI target devices and a second SCSI cable that daisy-chains the SCSI target devices together. A SCSI buffer device may be included, which has a first SCSI connector interfacing the first SCSI end connector and a second SCSI connector interfacing the second SCSI cable. The SCSI system is particular advantageous to connect two or more computer systems to a SCSI bus, where each computer includes a peripheral bus for interfacing any one of the SCSI controllers. The peripheral bus of each computer system may be of any type, such as a PCI bus, where the SCSI controllers are compatible SCSI PCI controller cards. In an exemplary embodiment, the computer systems are server devices for a local area network (LAN), where one computer is the primary server and the other system is the backup server.

It is now appreciated that a SCSI cable according to the present invention enables two or more SCSI controllers or initiators to be connected to one or more SCSI devices via a SCSI bus. A resistor placed in series with at least one of the SCSI conductors of the SCSI bus near each SCSI controller combines with the capacitance of the controller to absorb signal energy to prevent undesirable reflections. Traditional terminators are not used with the controllers or are otherwise disabled. The use of a SCSI cable according to the present invention enables primary and backup servers to be located on the same SCSI bus to communicate with SCSI targets. In the event of failure of the primary server, the backup server takes over and is able to operate in lieu of the primary server.

BRIEF DESCRIPTION OF THE DRAWINGS

A better understanding of the present invention can be obtained when the following detailed description of the preferred embodiment is considered in conjunction with the following drawings, in which:

FIG. 1 is a block diagram of a SCSI bus system including two computers connected to one or more SCSI devices via a SCSI bus cable implemented according to the present invention;

FIG. 2A is a more detailed schematic diagram of the Y connector of the SCSI bus cable of FIG. 1 including a series resistor;

FIG. 2B is a more detailed schematic diagram of the end connector of the SCSI bus cable of FIG. 1 including a series resistor.

DETAILED DESCRIPTION OF THE PREFERRED EMBODIMENT

Figure 3:
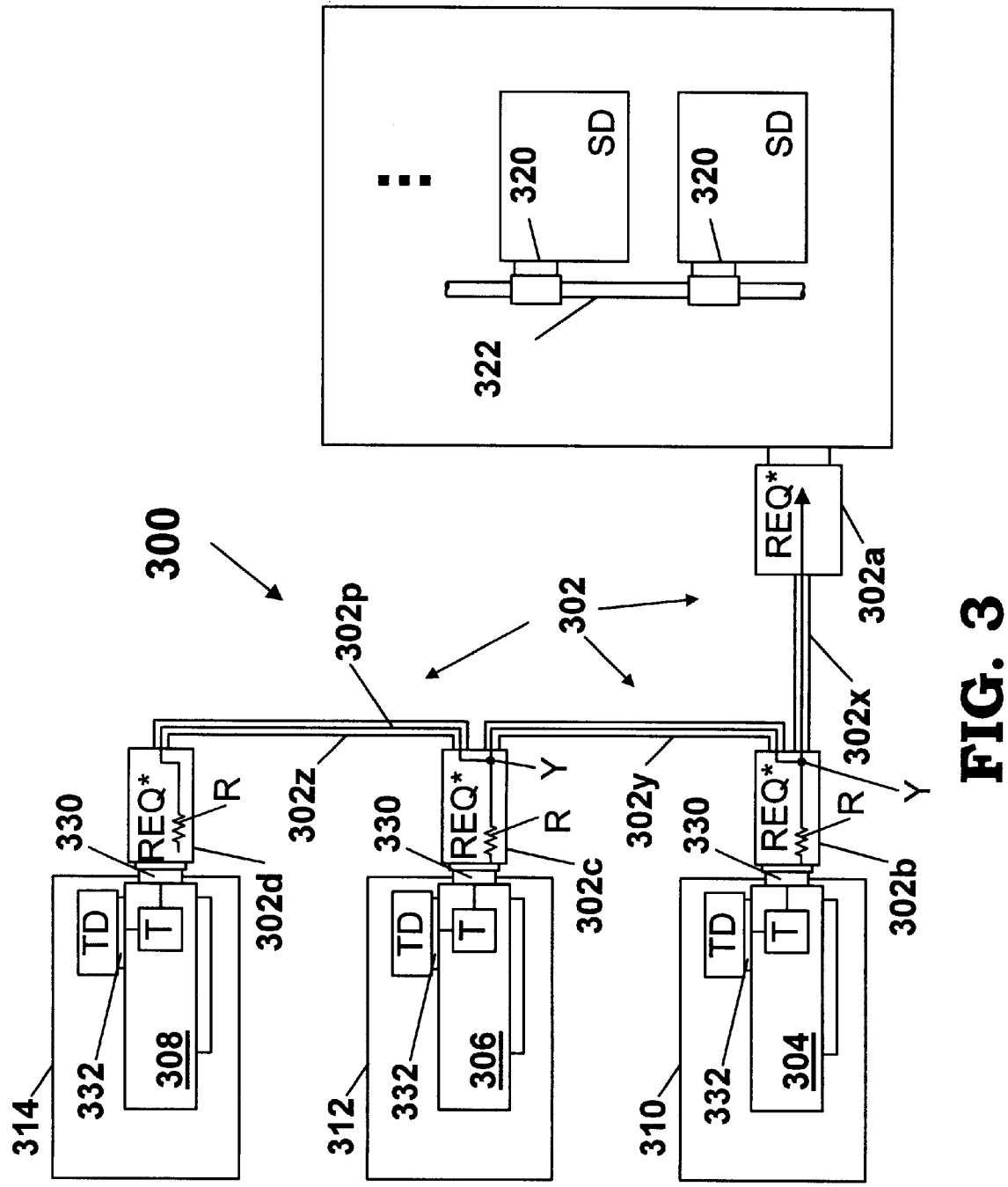
FIG. 3 is a schematic diagram showing a SCSI Y cable according to the present invention that couples storage devices to two or more SCSI controllers with terminators and terminator defeaters.

Referring now to FIG. 1, a block diagram of a SCSI bus system 100 is shown including two computers 102 and 104 connected to one or more SCSI devices 106 via a SCSI bus 108. The SCSI devices 106 are individually labeled S1, S2, . . . , Sn for a total of "n" devices, where n has a maximum value based upon the particular SCSI bus implemented. A Fast Wide SCSI bus with 16 data signals and 68 signals may include up to 16 total devices, where the total number includes SCSI controllers. The SCSI bus 108 preferably includes 50 or 68 conductors according to the SCSI-2 standard, although any number of conductors are contemplated depending upon the particular SCSI standard implemented. The SCSI devices 106 are any type of SCSI devices, such as hard disk drives, tape drives, optical drives including CD-ROM drives, CD-ROM writers, Magneto-Optical drives and WORM drives, printers, scanners, etc., where each includes an appropriate external SCSI connector 110. The SCSI devices 106 are preferably stacked within a tower unit (not shown) and coupled together using a cable 112, where the cable 112 includes a plurality of SCSI connectors 114 adapted to mate with and electrically interface the SCSI connector 110 of each SCSI device 106. In this manner, the SCSI devices are daisy-chained together on the SCSI bus 108. The connectors 110 and 114 are compatible SCSI connectors for enabling mechanical and electrical connection, such as male/female compatible IDC header connectors for ribbon cables or Centronics type connectors for twisted-wire pairs. Any suitable type of cables and connectors are contemplated. For daisy-chaining SCSI devices together in a tower unit or the like, a ribbon cable with IDC headers is common.

One end connector 114 of the cable 112 is connected to a connector 110 of a SCSI buffer device 113, which is provided to buffer one or more signals the SCSI bus 108 for the SCSI devices 106. The SCSI buffer device 113 includes a SCSI connector 113a, which is preferably a Centronics type connector. The SCSI bus 108 also includes a SCSI cable 116 implemented according to the present invention for coupling both of the computer systems 102 and 104 to the SCSI devices 106 via the SCSI buffer device 113. The SCSI cable 116 includes a first cable segment 116a having one end coupled to a SCSI connector 119, which is plugged into the connector 113a of the SCSI buffer device 113. The SCSI cable 116 also includes a second cable segment 116b having one end coupled to a SCSI end connector 120 and another end coupled to a SCSI Y connector 118. The other end of the cable segment 116a is coupled to the SCSI Y connector 118, which mechanically and electrically couples the cable segments 116a and 116b together. It is noted that the SCSI cable 116 may include more than two cable segments 116a, 116b, 116c, etc. and multiple Y connectors 118 for connecting more than two computer systems. In this manner, the first Y connector connects segments a and b, the second Y connector connects segments b and c and so on until the cable ends at the end connector 120. The connectors 118, 120 electrically couple the SCSI signals of the SCSI cable 116 to the respective SCSI controllers 126, 128.

The SCSI cables 116 and 112 essentially implement the SCSI bus 108 for coupling the computer systems 102 and 104 to the SCSI devices 106. The SCSI buffer 113 is optional and converts the cable and connector format between ribbon and Centronics types and also buffers one or more of the SCSI signals. In particular, the SCSI buffer device 113 buffers the edge sensitive clock signals, including the SCSI request (REQ*) and acknowledge (ACK*) signals. The remaining signals are level sensitive and buffering is not essential.

Each of the computer systems 102, 104 are any type of computer system that interfaces to a SCSI bus, such as IBM-compatible personal computer systems (PCs). The computer systems 102, 104 include expansion or peripheral buses 122, 124, respectively, which receive compatible input/output (I/O) expansion cards. The expansion buses 122, 124 could be any one of several different types, such as an integrated system architecture (ISA) bus, an extended-ISA (EISA) bus or a peripheral components interconnect (PCI) bus. The SCSI controller 126 includes a compatible expansion bus connector 126a, which is plugged into one of the slots of the expansion bus 122 of the computer system 102. The SCSI controller 128 includes a compatible expansion bus connector 128a, which is plugged into one of the slots of the expansion bus 124 of the computer system 104. The SCSI controller cards 126, 128 include appropriate external SCSI connectors 126b, 128b, respectively, for interfacing corresponding SCSI connectors. The SCSI controller cards 126 and 128 are both provided to control the SCSI bus 108 and to enable communication between the computer systems 102 and 104 and the SCSI devices 106 via the respective expansion buses 122, 124.

The connectors 118, 120 are configured to mechanically and electrically couple or mate to compatible SCSI connectors in a similar manner as the SCSI connectors 110, 114 described previously. As shown, the SCSI Y connector 118 is plugged into the connector 126b and the SCSI end connector 120 is plugged into the connector 128b. In the embodiment shown, the computer systems 102, 104 are preferably server systems, each including an appropriate network interface card (NIC) (not shown) that is coupled to the same network or to different networks as desired. In this example configuration, the computer systems 102, 104 are coupled to the same network (not shown), such as a local area network (LAN) or the like, where the computer system 102 is a primary server and the computer system 104 is a backup server for the network, or vice-versa.

The SCSI cable 116 is generally a one-to-one SCSI cable, where each of the cable segments 116a, 116b, etc. includes a plurality of a bus conductors, each for conducting a corresponding one of the SCSI signals of the SCSI bus 108. The SCSI controllers 126, 128 and the SCSI devices 106 preferably operate the SCSI bus 108 in single-ended mode, where each of the SCSI signals is paired with a corresponding ground signal.

Prior to the present invention, the configuration shown in FIG. 1 would not operate as desired and was discouraged in practice. In particular, the REQ* signal asserted by a target device, such as a SCSI device 106, generated undesirable reflections on the corresponding REQ* signal on the SCSI bus. The signal reflections effectively disabled communications between two or more computer systems and the SCSI devices. In this manner, the middle computer, such as the system 102, could not otherwise be available to operate as a backup server. The SCSI cable 116, however, is implemented to overcome this problem to enable both of the computer systems 102, 104 to communicate with the SCSI devices 106 via the SCSI bus 108. For proper operation of the SCSI bus system 100, the SCSI controller cards 126 and 128 do not include terminators. As described more fully below, if the SCSI controller cards 126 and 128 include built-in terminators, they are disconnected or otherwise defeated to enable proper operation.

FIG. 2A is a more detailed schematic diagram of the Y connector 118 of the SCSI cable 116. The cable segments 116a, 116b are both clamped to the Y connector 118 using an appropriate cable clamp 202. The individual signal conductors are coupled within the connector 118 to corresponding conductors 204, which conduct the signals to corresponding external contacts 206 in the form of pins or sockets for mating with a compatible SCSI connector. Such signal mapping is generally performed on a one-to-one basis so that each conductor within the cable segments 116a, 116b are electrically coupled to each other and to corresponding contacts 206 via corresponding conductors 204. Such Y connections are implemented in any suitable fashion, such as those used in Y connectors manufactured by AMP Incorporated. According to the present invention, however, at least one of the SCSI signal conductors from each of the cable segments 116a, 116b is coupled to one end of a resistor, having its other end coupled to the corresponding contact 206 of the connector 118. In particular, both of the conductors of the cable segments 116a, 116b for the REQ* signal are coupled together at a Y connection 208, which is then coupled to one end of a series resistor 210, having its other end coupled to a REQ* contact 206a of the connector 120. The resistor 210 is preferably mounted on a printed circuit board (PCB) or the like within the connector 118, although any other acceptable mounting scheme may be used.

FIG. 2B is a more detailed schematic diagram of the end connector 120 of the SCSI cable 116. The end connector 120 is configured in a very similar manner as the connector 118 except that only one cable segment is mapped to corresponding pins or sockets of the connector 120. In particular, the cable segment 116b is clamped by a clamp 222, which is similar to the clamp 202. The conductors of the cable segment 116b are coupled via conductors 224 within the end connector 120 to corresponding external contacts 226 in the form of pins or sockets on a one-to-one basis as previously described. Again, at least one of the SCSI signal conductors of the cable segment 116b is coupled to one end of respective series resistors, which have their other ends coupled to the corresponding contacts 226 of the connector 122. The conductor in the cable segment 116b for the REQ* signal is coupled to one end of a series resistor 230, having its other end coupled to the REQ* contact 226a of the connector 120. The resistor 230 is preferably mounted on a PCB or the like within the connector 120, although any other acceptable mounting scheme may be used.

The REQ* signal is asserted by any of the target SCSI devices 106 to request an information transfer handshake, and when driving the bus to latch the data signals of the SCSI bus 116 into the initiator's buffer. In this case, the initiator is either the computer system 102 or the computer system 104. The resistor 210 combines with the capacitance of the SCSI controller card 126 to form a low pass filter that filters signal reflections otherwise created by assertions of the REQ* signal by any of the SCSI devices 106. Likewise, the resistor 230 combines with the capacitance of the SCSI controller card 128 to form a low pass filter that filters signal reflections otherwise created by assertions of the REQ* signal by any of the SCSI devices 106. In this manner, assertions of the REQ* signal by any of the SCSI devices 106 are absorbed by the low pass filters formed using the resistors 210 and 230, so that reflections are substantially reduced or otherwise effectively eliminated at the ends of the SCSI bus 108.

Through experimentation, it was determined that the resistors 210 and 230 should each have a resistance of approximately 110 ohms to achieve proper operation of the SCSI bus system 100. The SCSI-2 specification recites between 90 and 140$\Omega$, where 110$\Omega$ is approximately near the center of this range. The impedance of SCSI controller cards without terminators has been determined to have a magnitude of about 60 ohms, and this impedance is mostly capacitive. Thus, the resistors 210 and 230 combine with the impedance of the SCSI controller cards 126, 128 to result in a proper SCSI impedance having a magnitude of approximately 90 ohms. Of course, other resistor values for the resistors 210, 230 are contemplated. Higher resistor values may also be used to maintain the target impedance range of between 90–140 ohms.

It is noted that although only one of the SCSI signals (REQ*) is shown including a series resistor 210, 230, other SCSI signals may include a series resistor if desired to eliminate reflections on those signals. When either the computer system 102 or the computer 104 is driving the SCSI bus 116, the ACK* signal is used to latch the SCSI data signals into the target's buffer, which is any one of the SCSI devices 106. A terminator placed at the last SCSI device 106, namely the SCSI device Sn, absorbs assertions of the ACK* signal so that significant reflections are not observed on the SCSI bus 108. If significant reflections are observed in a particular implementation, however, series resistors could be added for the ACK* signal. Alternatively, the ACK* signal could be buffered and terminated.

FIG. 3 is a schematic diagram of a SCSI bus system 300 including a SCSI cable 302 implemented according to the present invention. The SCSI cable 302 couples several SCSI controllers 304, 306 and 308 of several computer systems 310, 312 and 314, respectively, to one or more storage devices (SD). The storage devices SD each include a SCSI connector 320 and are chained together via a SCSI cable 322 in a similar manner as described previously. Each SCSI controller 304, 306 and 308 includes a SCSI connector 330. The SCSI cable 302 includes SCSI connectors 302a, 302b, 302c and 302d coupling corresponding cable segments 302x, 302y and 302z, where the SCSI connectors 302b, 302c and 302c of the SCSI cable 302 are plugged into respective SCSI connectors 330. The SCSI connector 302a is electrically coupled to the SCSI cable 322 in any desired manner, such as through a buffer device or the like.

Preferably, the SCSI system 300 is implemented according to Fast Wide SCSI-2, where each of the SCSI cables include 68 conductors and the SCSI connectors include 68 contacts. The SCSI controllers 304, 306 and 308 are preferably implemented as Fast Wide SCSI-2 PCI controllers for plugging into PCI slots of respective PCI buses (not shown) of the respective computer systems 310, 312 and 314. The present invention, however, is not limited to any particular SCSI or expansion bus implementations. Also, the SCSI bus system is operated according to the single-ended mode.

The SCSI connectors 302a, 302b, 302c and 302d each include at least one internal series resistor (R) for the REQ* signal in a similar manner as described above for the SCSI Y connector 118 and the SCSI end connector 120. Since there are three computer systems 314, 316 and 318, the connectors 302a and 302d are implemented as SCSI end connectors and the connectors 302b and 302c are implemented as Y connectors. The Y connectors 302b and 302c are implemented in a similar manner as the Y connector 118 and the end connectors 302a and 302d are implemented in a similar manner as the end connector 120. It is understood that more Y connectors could be included in the SCSI cable 302 between the end connectors 302a, 302d to couple more computer systems if desired. Each of the Y connectors 302b and 302c includes a Y connection (Y) coupled to a conductor 302p conducting the REQ* signal of the SCSI cable 302. Each Y connection Y is implemented in any desired manner, such as a straight through conductor connected to one end of the corresponding resistor R, a solder connection between signal conductors of adjacent cable segments, one or more electrical connectors to electrically couple the respective request signal conductors together and to the corresponding resistor R, etc.

As shown in FIG. 3, the conductor 302p of the SCSI cable 302 is effectively coupled between the REQ* signal of the storage devices SD and the last or end resistor R of the SCSI connector 302d. A Y connection Y is coupled at an intermediate location along the conductor 302p for each Y connector of the SCSI cable 302. An intermediate series resistor R is included and coupled between each Y connection Y and the corresponding REQ* signal conductive contact of the corresponding SCSI controller. In this manner, the REQ* signal of the SCSI cable 302 is effectively terminated to enable communication on the SCSI cable 302 between all of the SCSI controllers 304, 306 and 308 and the SCSI devices SD.

The SCSI controllers 304, 306 and 308 include built-in terminators (T) that are coupled to the respective SCSI connectors 330. Each of the SCSI controllers 304, 306 and 308 also includes a connector 332 coupled to the respective terminators T for receiving a terminator defeater (TD). Terminator defeaters TD are coupled to each of the connectors 332 of each of the SCSI controllers 304, 306 and 308 to defeat or remove the effects of the respective terminators T. In this manner, all three of the computer systems 310, 312 and 314 communicate with the storage devices SD via the SCSI cables 302 and 322.

It is now appreciated that a SCSI cable according to the present invention enables two or more SCSI controllers or initiators to be connected to one or more SCSI devices via a SCSI bus. A resistor placed in series with at least one of the SCSI conductors of the SCSI bus near each SCSI controller combines with the capacitance of the controller to absorb signal energy to prevent undesirable reflections. Traditional terminators are not used with the controllers or are otherwise disabled. The use of a SCSI cable according to the present invention enables primary and backup servers to be located on the same SCSI bus to communicate with SCSI targets. In the event of failure of the primary server, the backup server takes over and is able to operate in lieu of the primary server.

Although a system and method according to the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

I claim:

1. A SCSI cable for conducting SCSI signals, comprising:
   first and second SCSI cable segments, each including a SCSI signal conductor for each SCSI signal;
   a SCSI Y connector that includes a plurality of connector contacts to couple corresponding SCSI signal conductors of each of said first and second SCSI cable segments together and to corresponding ones of said plurality of connector contacts of said SCSI Y connector;
   a first resistor coupled between one SCSI signal conductor of each of said first and second SCSI cable segments and a corresponding connector contact of said SCSI Y connector;
   a SCSI end connector including a plurality of connector contacts that couples corresponding SCSI signal conductors of said second SCSI cable segment to corresponding ones of said plurality of connector contacts; and
   a second resistor coupled between one SCSI signal conductor of said second cable segment and a corresponding connector contact of said SCSI end connector.

2. The SCSI cable of claim 1, further comprising:
   said one SCSI signal conductor coupled to said first resistor conducting a SCSI request signal; and
   said one SCSI signal conductor coupled to said second resistor conducting said SCSI request signal.

3. The SCSI cable of claim 1, wherein said first and second resistors are each approximately 110 ohms.

4. The SCSI cable of claim 1, wherein said first and second cable segments each include 68 conductors.

5. The SCSI cable of claim 1, wherein said first and second cable segments include twisted-wire pairs.

6. The SCSI cable of claim 1, wherein said first and second cable segments and said SCSI Y and end connectors are cable of operating according to Fast Wide SCSI-2.

7. A filtered SCSI connection for a SCSI cable coupled between a plurality of SCSI controllers and at least one SCSI target device, the SCSI controllers and the at least one target device each including a SCSI request signal connection, the filtered SCSI connection comprising:
   a conductor having a first end for electrically coupling to the request signal connection of the SCSI target device and a second end;
   an end resistor having a first end coupled to said second end of said conductor and a second end for coupling to a request signal connection of a corresponding SCSI controller;
   at least one Y connection, each electrically coupled to said conductor at a corresponding intermediate location between said first and second ends of said conductor; and at least one intermediate resistor, each having a first end coupled to a corresponding Y connection and a second end for coupling to a request signal connection of a corresponding SCSI controller.

8. The filtered SCSI connection of claim 7, wherein said end resistor and each said intermediate resistor terminates each request signal connection to an impedance between 90 to 140 ohms inclusive.

9. The filtered SCSI connection of claim 7, wherein said end resistor and each said intermediate resistor have a resistance of approximately 110 ohms.

10. The filtered SCSI connection of claim 7 for coupling three SCSI controllers to at least one storage device, further comprising:

said at least one Y connection comprising two Y connections, each electrically coupled to said conductor at one of two intermediate locations between said first and second ends of said conductor; and said at least one intermediate resistor comprising two intermediate resistors, each having a first end coupled to one of said two Y connections and a second end for coupling to a request signal connection of a corresponding one of the three SCSI controllers.

11. A SCSI system, comprising:

at least two SCSI controllers, each having a SCSI connector including a request signal contact;

at least one SCSI target device having a SCSI connector including a request signal contact; and a SCSI cable, comprising:

at least two SCSI cable segments daisy-chained together having a first end and a second end, each of said at least two SCSI cable segments including a request signal conductor;

a first SCSI end connector plugged into said SCSI connector of said at least one SCSI target device and coupled to said first end of said daisy-chained SCSI cable segments, said first SCSI end connector coupling said request signal contact of said at least one SCSI target device to a request signal conductor of said daisy-chained SCSI cable segments;

at least one SCSI Y connector, each plugged into a SCSI connector of one of said at least two SCSI controllers and including an intermediate Y connection for coupling together adjacent SCSI cable segments, each of said at least one SCSI Y connector including a resistor having one end coupled to said request signal conductors of said adjacent SCSI cable segments and a second end coupled to a request signal conductor of said SCSI connector of said one of said at least two SCSI controllers; and a second SCSI end connector plugged into said SCSI connector of another one of said at least two SCSI controllers and coupled to said second end of said daisy-chained SCSI cable segments, said second SCSI end connector including an end resistor coupled between a request signal conductor of said daisy-chained SCSI cable segments and a request signal conductor of said another one of said at least two SCSI controllers.

12. The SCSI system of claim 11, further comprising:

said resistor of each of said at least one SCSI Y connector and said end resistor each filtering corresponding request signal conductors of SCSI cable segments to an impedance of between 90 to 140 ohms inclusive.

13. The SCSI system of claim 11, further comprising:

said at least one SCSI target device comprising a plurality of SCSI target devices; and a second SCSI cable daisy-chaining said plurality of SCSI target devices together.

14. The SCSI system of claim 13, further comprising:

a SCSI buffer device having a first SCSI connector interfacing said first SCSI end connector and a second SCSI connector interfacing said second SCSI cable.

15. The SCSI system of claim 11, further comprising:

at least two computer systems, each including a peripheral bus for interfacing any one of said at least two SCSI controllers.

16. The SCSI system of claim 15, wherein said peripheral bus of each of said at least two computer systems comprising a PCI bus.

* * * * *